US011580734B1

(12) United States Patent
Soryal

(10) Patent No.: US 11,580,734 B1
(45) Date of Patent: Feb. 14, 2023

(54) DISTINGUISHING REAL FROM VIRTUAL OBJECTS IN IMMERSIVE REALITY

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/384,943

(22) Filed: Jul. 26, 2021

(51) Int. Cl.
| | |
|---|---|
| *G06V 20/20* | (2022.01) |
| *G06F 3/01* | (2006.01) |
| *G06T 3/40* | (2006.01) |
| *G06T 11/60* | (2006.01) |
| *G06V 10/75* | (2022.01) |
| *G06T 19/00* | (2011.01) |

(52) U.S. Cl.
CPC ............. *G06V 20/20* (2022.01); *G06F 3/011* (2013.01); *G06T 3/40* (2013.01); *G06T 11/60* (2013.01); *G06T 19/006* (2013.01); *G06V 10/751* (2022.01)

(58) Field of Classification Search
CPC ...... G06V 20/20; G06V 10/751; G06F 3/011; G06T 3/40; G06T 11/60; G06T 19/006
See application file for complete search history.

(56) References Cited

U.S. PATENT DOCUMENTS

| | | | | |
|---|---|---|---|---|
| 9,613,298 B2* | 4/2017 | Guzmán-Rivera | .. | G06K 9/6256 |
| 10,078,917 B1* | 9/2018 | Gaeta | ................. | G06F 3/04815 |
| 10,389,992 B2* | 8/2019 | Shuster | .................. | H04N 13/30 |
| 11,200,745 B2* | 12/2021 | Johnson | .................. | G06F 3/011 |
| 11,348,269 B1* | 5/2022 | Ebrahimi Afrouzi | ........................ G01S 7/4804 |
| 11,361,735 B1* | 6/2022 | Wang | ........................ | G09G 5/37 |
| 2004/0109022 A1* | 6/2004 | Bennett | ............... | G06F 3/04815 715/757 |
| 2012/0194516 A1* | 8/2012 | Newcombe | ............. | G06T 17/00 345/420 |
| 2015/0091780 A1* | 4/2015 | Lyren | .................. | G02B 27/017 345/8 |
| 2016/0042567 A1* | 2/2016 | Shuster | ................. | G06T 19/006 345/633 |

(Continued)

*Primary Examiner* — Motilewa Good-Johnson
(74) *Attorney, Agent, or Firm* — Guntin & Gust, PLC; Douglas Schnabel

(57) ABSTRACT

Aspects of the subject disclosure may include, for example, a camera positioned to capture image information of an immersive experience presented to one or more users engaged in the immersive experience and located in an immersive experience space, a processing system and a memory that stores executable instructions to facilitate performance of operations including receiving the image information from the camera, detecting objects located in the immersive experience space with the one or more users, the objects including at least one virtual object created by the immersive experience, determining the at least one virtual object is a projected virtual object of the immersive experience, generating a signal indicating the at least one virtual object is a projected virtual object, and a projector, responsive to the signal, to provide a visual indication in the immersive experience space to identify the projected virtual object as a virtual object to the one or more users engaged in the immersive experience. Other embodiments are disclosed.

20 Claims, 9 Drawing Sheets

(56) References Cited

U.S. PATENT DOCUMENTS

| | | | |
|---|---|---|---|
| 2016/0267720 A1* | 9/2016 | Mandella | H04N 5/232 |
| 2018/0005445 A1* | 1/2018 | McCulloch | G06V 20/20 |
| 2018/0093186 A1* | 4/2018 | Black | A63F 13/212 |
| 2018/0293041 A1* | 10/2018 | Harviainen | H04N 13/332 |
| 2018/0324539 A1* | 11/2018 | Lovitt | G06T 19/006 |
| 2019/0333278 A1* | 10/2019 | Palangie | G06T 19/003 |
| 2020/0026922 A1* | 1/2020 | Pekelny | G06T 19/006 |
| 2020/0225734 A1* | 7/2020 | Magnusson | G06F 3/011 |
| 2020/0371596 A1* | 11/2020 | Lee | G02B 27/0172 |
| 2021/0283496 A1* | 9/2021 | Mandella | H04N 5/232 |
| 2021/0374982 A1* | 12/2021 | Velinov | G06T 7/507 |
| 2022/0188545 A1* | 6/2022 | Nagar | G06T 19/006 |

* cited by examiner

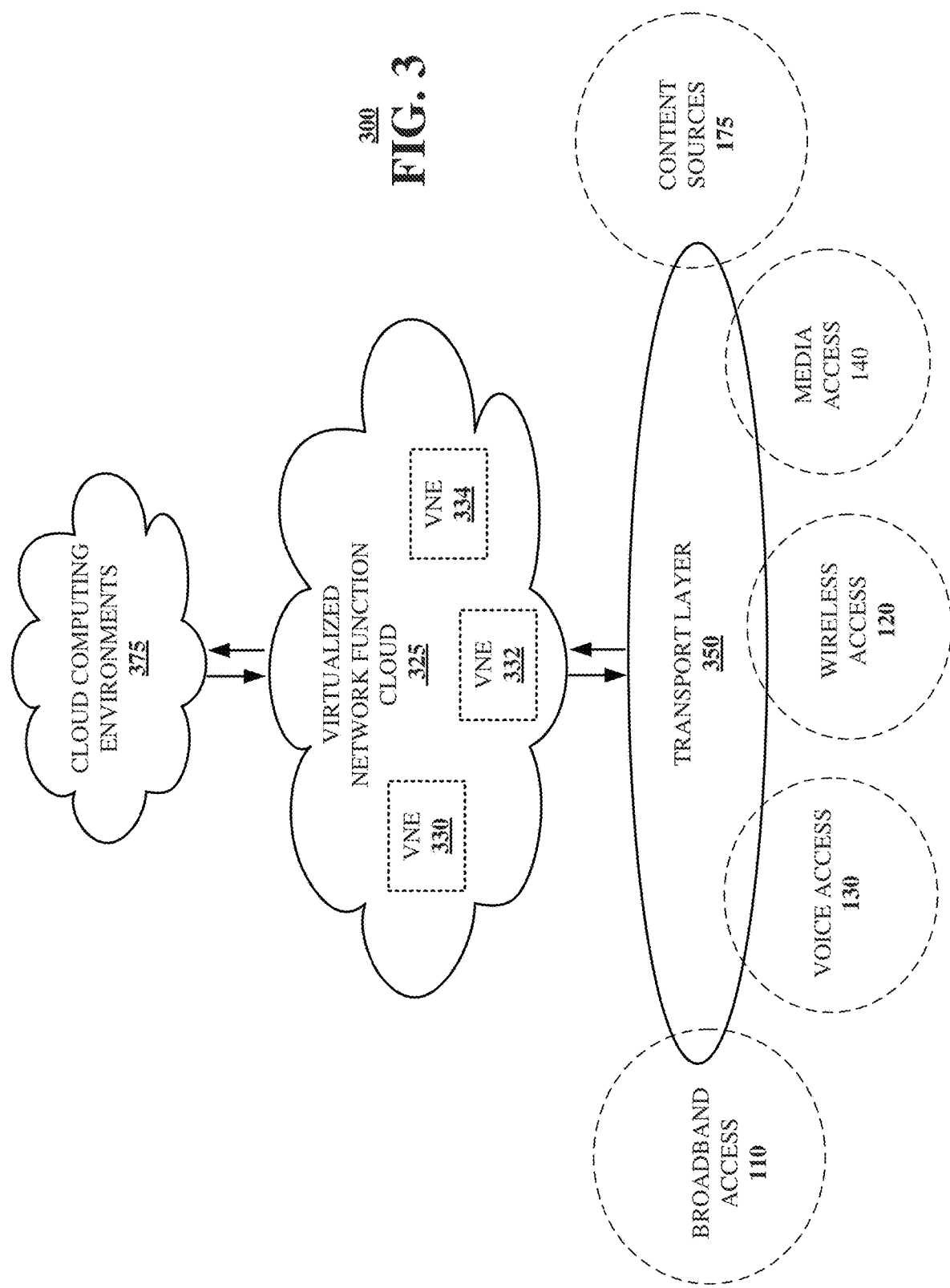

DISTINGUISHING REAL FROM VIRTUAL OBJECTS IN IMMERSIVE REALITY

FIELD OF THE DISCLOSURE

The subject disclosure relates to automatically distinguishing real objects from virtual objects in an immersive reality environment.

BACKGROUND

Immersive experiences enable a user to participate in activities that may include virtual objects or holograms as well as real, physical objects and actions. In a deep level of immersion by the user, distinctions between real objects and virtual objects become unclear.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
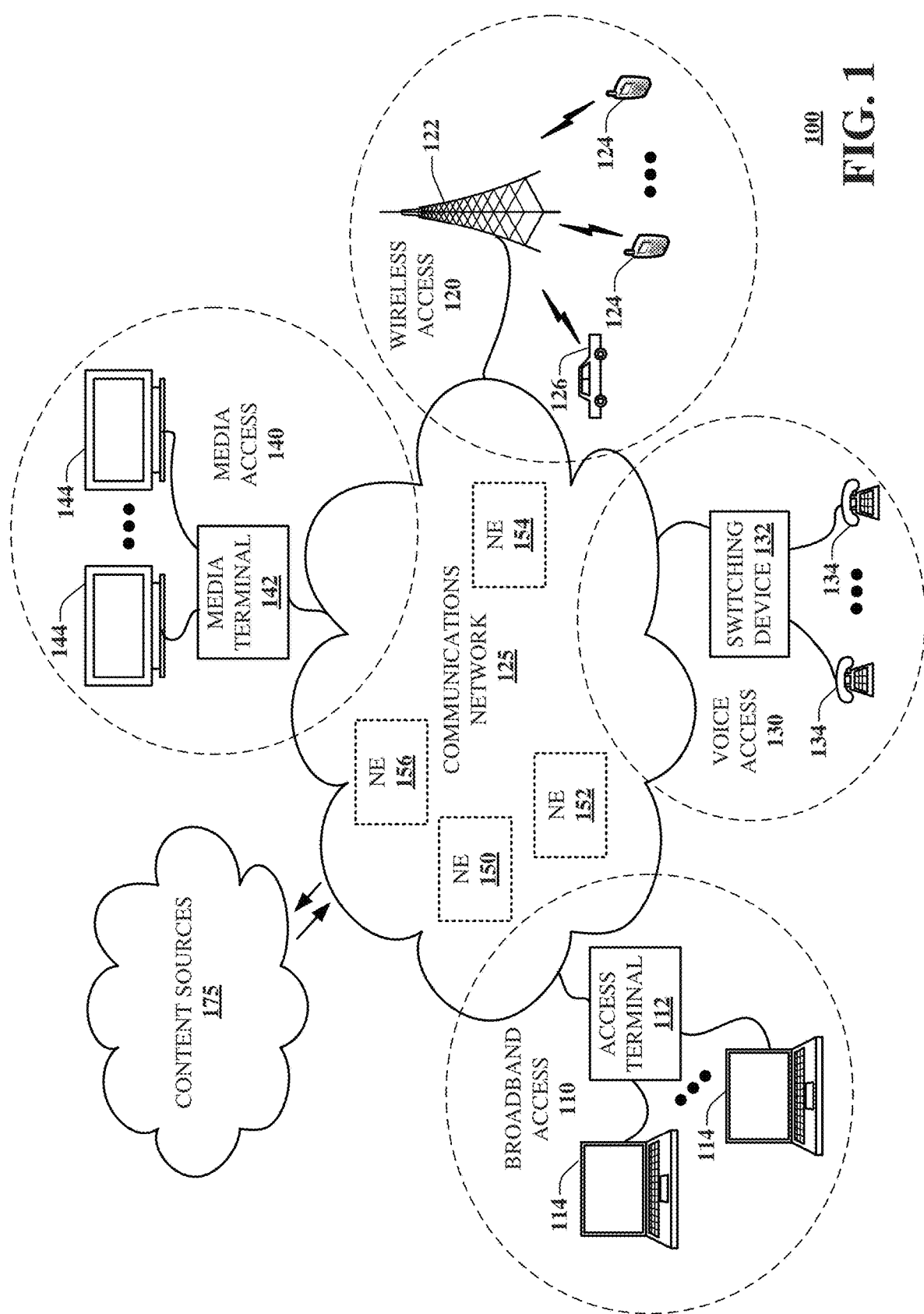
FIG. 1 is a block diagram illustrating an exemplary, non-limiting embodiment of a communications network in accordance with various aspects described herein.

The subject disclosure describes, among other things, illustrative embodiments for detecting suspected objects that may be virtual objects or holograms in an immersive experience and, if the suspected objects are determined to be virtual objects or holograms and not real or physical objects, modifying a visual aspect of the suspected objects. This enables a user participating in the immersive experience to feel comfort and reassurance about a suspected object that might seem threatening to the user, or about an unexpected situation that might seem threatening or alarming to the user. Other embodiments are described in the subject disclosure.

One or more aspects of the subject disclosure include a camera positioned to capture image information of an immersive experience presented to one or more users engaged in the immersive experience and located in an immersive experience space, a processing system and a memory that stores executable instructions to facilitate performance of operations including receiving the image information from the camera, detecting objects located in the immersive experience space with the one or more users, the objects including at least one virtual object created by the immersive experience, determining the at least one virtual object is a projected virtual object of the immersive experience, generating a signal indicating the at least one virtual object is a projected virtual object, and a projector, responsive to the signal, to provide a visual indication in the immersive experience space to identify the projected virtual object as a virtual object to the one or more users engaged in the immersive experience.

One or more aspects of the subject disclosure include receiving image data from a camera, the camera positioned to collect images of an immersive experience occurring in an immersive experience space including one or more objects and one or more users engaged in the immersive experience, detecting, based on the image data, an unexpected situation of the immersive experience, the unexpected situation including a suspected object or a suspected action, and identifying virtual objects and real objects among the one or more objects responsive to the detecting. Aspects of the subject disclosure may further include modifying a visual aspect of at least one virtual object of the one or more objects in the immersive experience to identify to the one or more users the at least one virtual object as a virtual object for reassuring the one or more users engaged in the immersive experience.

One or more aspects of the subject disclosure include projecting an immersive experience in an immersive experience space occupied by one or more real objects and one or more user, including projecting one or more holograms in the immersive experience space, receiving image information from a camera viewing the immersive experience space during the projecting of the immersive experience, and receiving sensor information from one or more sensors located in the immersive experience space. One or more aspects of the subject disclosure may further include receiving an indication from a user, the indication requesting a verification from the processing system of a suspected object in the immersive experience space, determining whether the suspected object is a real object or a hologram of the one or more holograms projected in the immersive experience space, wherein the determining is responsive to the image information and the sensor information, and modifying a visual aspect of the suspected object in the immersive experience space, wherein the modifying is responsive to a determination that the suspected object comprises a hologram, and wherein the modifying the visual aspect forms a clear verification to the user that the suspected object is a hologram.

Referring now to FIG. 1, a block diagram is shown illustrating an example, non-limiting embodiment of a system 100 in accordance with various aspects described herein. For example, system 100 can facilitate in whole or in part presenting an immersive experience to a user, determining if an object or a situation in the immersive experience is likely to make the user feel apprehension or concern, identifying the situation or identifying the object as a virtual object, and changing the visual appearance of the object or the situation to verify real and virtual objects in the immersive experience. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
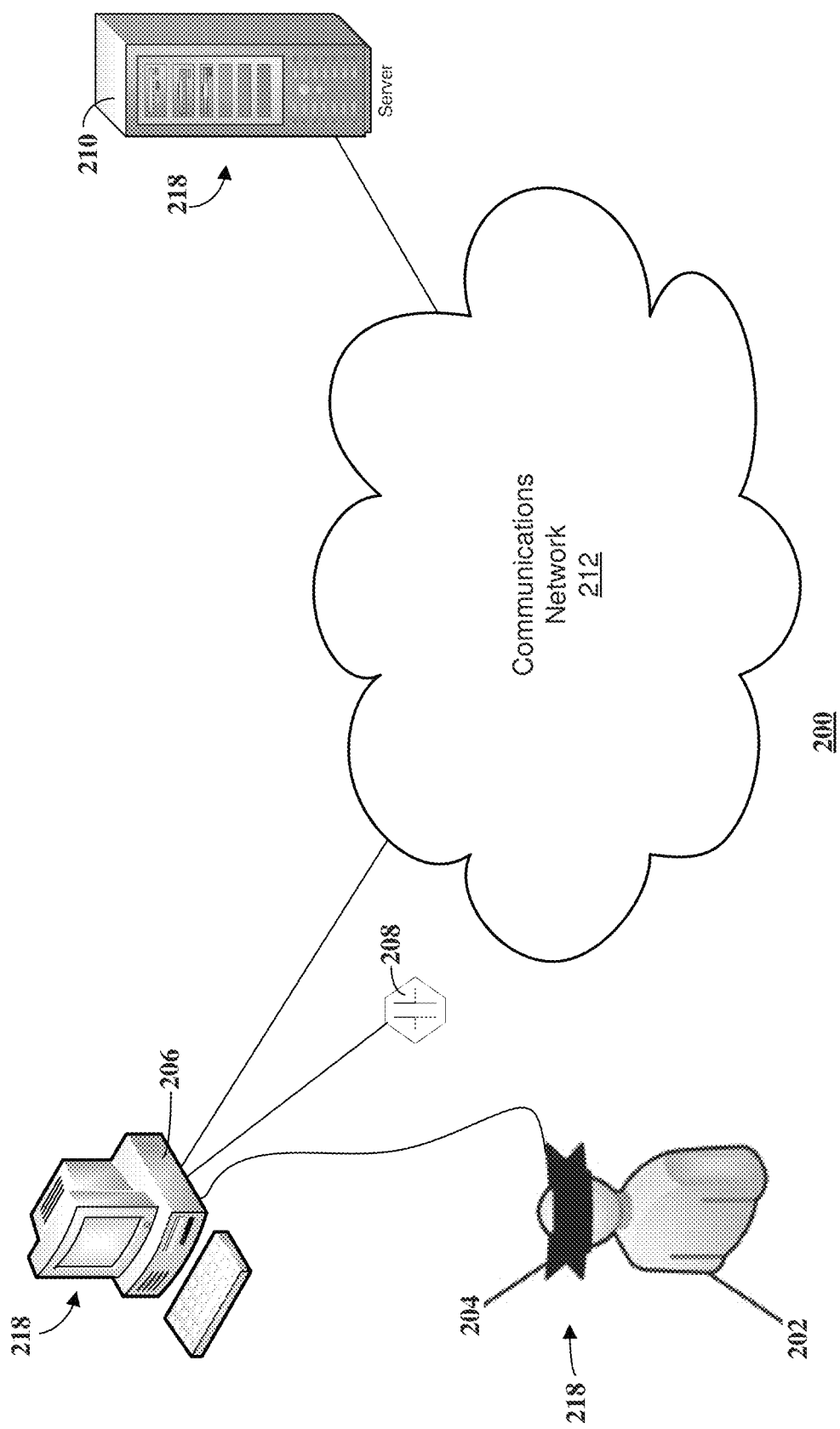
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning, for example, within the communication network 100 of FIG. 1 in accordance with various aspects described herein. The system 200 in this embodiment enables a user 202 to interact with an extended reality (XR) environment. The system 200 in this embodiment includes a virtual reality (VR) headset 204 wearable by the user 202, one or more sensors 208, a user computer 206, and an augmented reality (AR) server 210 accessible over a communications network 212.

The VR headset 204 enables the user 202 to experience, generally, an XR environment, where XR is a general term intended to encompass XR, VR and AR systems, equipment and environments. The VR headset 204 generally includes a data processing system including one or more processors, a memory for storing data and instructions, and a communication interface. The VR headset 204 provides visual display to the user 202 and may include one or more display screens within the VR headset 204 to control the view seen by the user 202 and the environment experienced by the user. Further, the VR headset 204 may include a camera for capturing images of the environment of the user. The VR headset 204 may include speakers to provide sound information to the user 202 and the VR headset 204 may include one or more microphones to collect sound information about the environment of the user 202. In other embodiments, the VR headset 204 may be embodied as AR glasses or other wearable devices or may be operated in conjunction with a fixed display system such as a computer monitor, television or series of display screens in the physical environment with the user 202.

The sensors 208 may include any sort of condition sensing and data collection apparatus suitable for the embodiment of the system. The sensors may include one or more cameras that collect images of the physical environment near the user 202. The cameras may collect visual images, infra-red images and others. The sensors 208 may include environmental sensors that collect information such as temperature, wind speed, orientation or acceleration, or other physical factors of the environment where the user 202 is located. If the user 202 is operating a vehicle, the sensors 208 may detect vehicle speed and steering, acceleration and braking inputs by the user 202. If the vehicle is a driver assisted vehicle, the sensors 208 may collect all information available to the driver assistance system such as images from cameras, navigation and location data, data from Lidar sensors, and others. The sensors 208 may further gather information about the user 202. Such information may include biometric information, such as pulse rate or respiratory rate, skin conductivity, pupil dilation, haptic information about one or more touches of the user 202, and so forth. Thus, the sensors may include or be part of a wearable device such as a watch, belt or harness. Further, such user data may include information about the position, posture and movement of the user. Any sort of data that may be useful by the system 200 for monitoring the user 202 and controlling the XR environment may be sensed by the sensors 208. In some embodiments, the sensors 208 merely sense a condition and report information. In other embodiments, one or more of the sensors 208 may be controllable, such as by the user computer 206.

The user computer 206 is in data communication with the VR headset 204 and the sensors 208. In the illustrated embodiment, the user computer 206 has wireline connections to the VR headset 204 and the sensors 208. In other embodiments, the wireline connections may be supplemented or replaced with one or more wireless connections, such as a WiFi connection according to the IEEE 802.11 family of standards or a Bluetooth connection according to the Bluetooth standard.

The user computer 206 cooperates with the VR headset 204 to provide the XR environment for the user 202. The user computer 206 communicates with the VR headset 204 to provide video information, audio information and other control information to the VR headset 204. The user computer 206 communicates with the sensors 208 to collect information about the physical environment and the user 202. The user computer 206 communicates with the AR server 210 to provide video and other information from the VR headset 204 to the AR server 210 and to provide information and data from the sensors 208 to the AR server 210. The video and data may be sent in any suitable format, including encoding to reduce the amount of data transmitted or encrypted to maintain security of the data. The user computer 206 communicates to the VR headset 204 virtual reality information to the VR headset 204. In some embodiments, the functionality provided by the user computer 206 may be combined with the VR headset 204. In the embodiment of FIG. 2A, the user computer 206 is shown as a desktop computer. However, any suitable processing system, including one or more processors, memory and communications interface, may implement the functions of the user computer 206.

The AR server 210 controls provision of the XR environment to the VR headset 204 for the user 202. The AR server 210 generally includes a processing system including one or more processors, a memory for storing data and instructions and a communications interface. The AR server 210 may be implemented as a single server computer, as multiple server computers at one or multiple locations or in any suitable manner. In the system 200, the AR server 210 implements an augmented reality (AR) engine.

The AR server 210 receives over the communications network 212 information about the environment of the user 202, including location information, information about objects in the environment and events occurring in the environment. The AR server 210 in some embodiments may further receive information about the user 202, including biometric information and information about the performance of the user 202. The information may come from the sensors 208, the VR headset 204, or any other source. The AR server 210 provides control information over the communications network 212 including video information, sound information, haptic information and any other information, including instructions and data, to the other components of the system 200 including the user computer 206 and the VR headset 204.

The AR engine 221 develops the XR environment as a combination of the actual environment in which the user 202 is located and a simulated or virtual environment, to achieve ends such as training, education, performance improvement, and behavioral improvement for the user 202. For example, if the user 202 is being trained to operate an apparatus, the AR engine 221 may receive input information describing the user's control inputs for operating the apparatus, for example from the sensors 208. The AR server 210 may react to this input information, to measure the performance or behavior of the user 202. In response, the AR server 210 may modify the XR environment of the user 202. The AR engine 221 creates the XR environment, receives from the user 202 and the XR environment information about the performance of the user 202 in the environment as feedback, and in turn, modifies the XR environment to accomplish the desired end, such as training or behavioral modification for the user 202.

The system 200 may be supplemented with other equipment as desired or required for a particular purpose. For example, the system 200 may include one or more remote cameras to provide video information about the environment of the user. In one embodiment, where the system 200 is enabling education and training of the user on a particular device, one or more cameras may capture images of the device and its location in the environment. The images may be combined with images captured by other cameras, including a camera of the VR headset 204, and with virtual images produced by the AR server 210. Further, the system 200 may be supplemented with other wearable devices to provide additional feedback, such as haptic feedback to the user 202, or further sensors to collect information about the user 202 such as the heart rate and blood pressure of the user 202.

The communications network 212 may include any combination of wireline and wireless communication networks, including but not limited to broadband access network 110, wireless access network 120, voice access network 130 and media access network 140 (FIG. 1). The communications network 212 may include the internet and may provide access to other devices and services as well.

The system 200 thus creates or modifies visual information in an XR experience that correlates to observable behavioral changes in the user 202. Using cameras, microphones and other sensors, the system 200 detects objects in the scene viewed by the user 202 through the VR headset 204. Further, in some embodiments, the system 200 detects user biometric information to determine a status of the user 202, such as user anxiety and experience. The system 200 may draw on learned information available to the system 200, such machine learning solutions, to understand the status of the user 202 as well as to understand the environment of the user 202 and objects in the environment. The system 200, by cooperation between the AR server 210 and the VR headset 204, may control the visual, audible and otherwise sensible environment of the user 202. For example, in the visual realm, the system 200 can substitute or erase non-essential objects for a task to be performed by the user. Further, the system 200 can provide immersive reinforcement for behavior of the user 202. This can be done for a wide variety of reasons, including to train the user 202 to new behaviors or to modify the user 202 to avoid past bad behaviors or to improve future behaviors for the user 202.

The system 200 thus provides an immersive experience for the user. As hardware, software and communications technology have evolved and improved, such immersive experiences have become more and more realistic and immersive for users such as the user 202. Moreover, as immersive technology continues to develop, the contrast between reality and virtuality has become more difficult to discern for some users. This will continue to be the case in the future, such as due to the advances of very high speed sixth generation (6G) wireless networks and the advances of projection systems which provide improved clarity and realistic images, audio and other sensations for the user.

At times, it can be difficult for a user such as user 202 to distinguish between what is real and what is virtual when engaged in the virtual environment. This may create illusion and misjudgment for the user either on the individual level or the group or community level. In an example, a user is at a party engaged with other users of a group in an immersive environment. In the immersive experience, to the user some other people are physically present, but others are holograms. They are physically located elsewhere but are virtually present in the immersive experience space and within the immersive experience. It may happen that a dangerous situation may present itself, such as a participant wielding a weapon. Because of the convincing reality of the immersive experience, the user may not be able to discern a genuinely dangerous situation, in which the use with the weapon is physically present, from the less dangerous situation where the other user and the weapon are only virtually present.

The system 200 accordingly include a verification module 218 that provides to a user a reference check for a given situation in an immersive experience. The verification module is triggered in any suitable manner, such as based on a request by a user or based on the circumstances of the immersive experience. The verification module operates to clarify what users are sensing in the immersive experience and whether an object or other feature of the immersive experience is reality or virtuality. A user or group of users may be fully immersed in the experience but at any given time, one or more users can command the verification module to separate real from fiction. The users can continue the immersion experience as desired.

The verification module 218 may be located and operational at any convenient location in the system 200. In a first embodiment, the verification module 218 includes instructions and data stored on the user computer 206. In a second embodiment, the verification module 218 includes instructions and data stored on the VR headset 204 worn by the user. In a third embodiment, the verification module 218 includes instructions and data stored on the AR server 210. In some embodiments, the verification module 218 is an application program (app) operating on a device of the user 202, such as the VR headset 204 or other wearable device, or even on a mobile phone or other device of the user 202. In further embodiments, the verification module 218 may include software components and hardware components shared across multiple locations in the system 200. The multiple components of the verification module interact to provide the functionality described herein. Segmenting and separation of the components of the verification module 218 may be done according to any design preferences or constraints such as the communication speed of the communications network 212 or the processing power of the VR headset 204.

In embodiments, the verification module 218 receives an input and responds to the input to visually modify a questioned object in the immersive experience as an alert to identify the questioned object as being virtual. In an embodiment, the verification module receives an indication from the user 202 or another user requesting identification or verification of a suspected object by the verification module for the user 202. The indication may be a predefined hand gesture or a spoken word by the user 202, or any other identification of a suspected object and a request for clarification. The alert may be a visual modification such as be a blurring or pixelating of the image of the suspected object, a highlighting of the suspected object, a changing of colors of the suspected object, a flashing of the suspected object, or any other visual cue that the suspected object is a virtual element and not a real element in the immersive experience. A virtual element is an element which is other than a physical object located in the space or environment with the user 202 but is artificially generated and animated by a processing device as part of the immersive experience.

In other examples, the alert or identification of the questioned object in response to the user request by the user 202 may be in any suitable form. For example, an audible indicator may be provided as the alert to the user 202, such as a verbal confirmation like, "that object is virtual, not real." In another example, a predetermined tone may be sounded by the verification module 218 as the alert to the user 202.

Figure 2B:
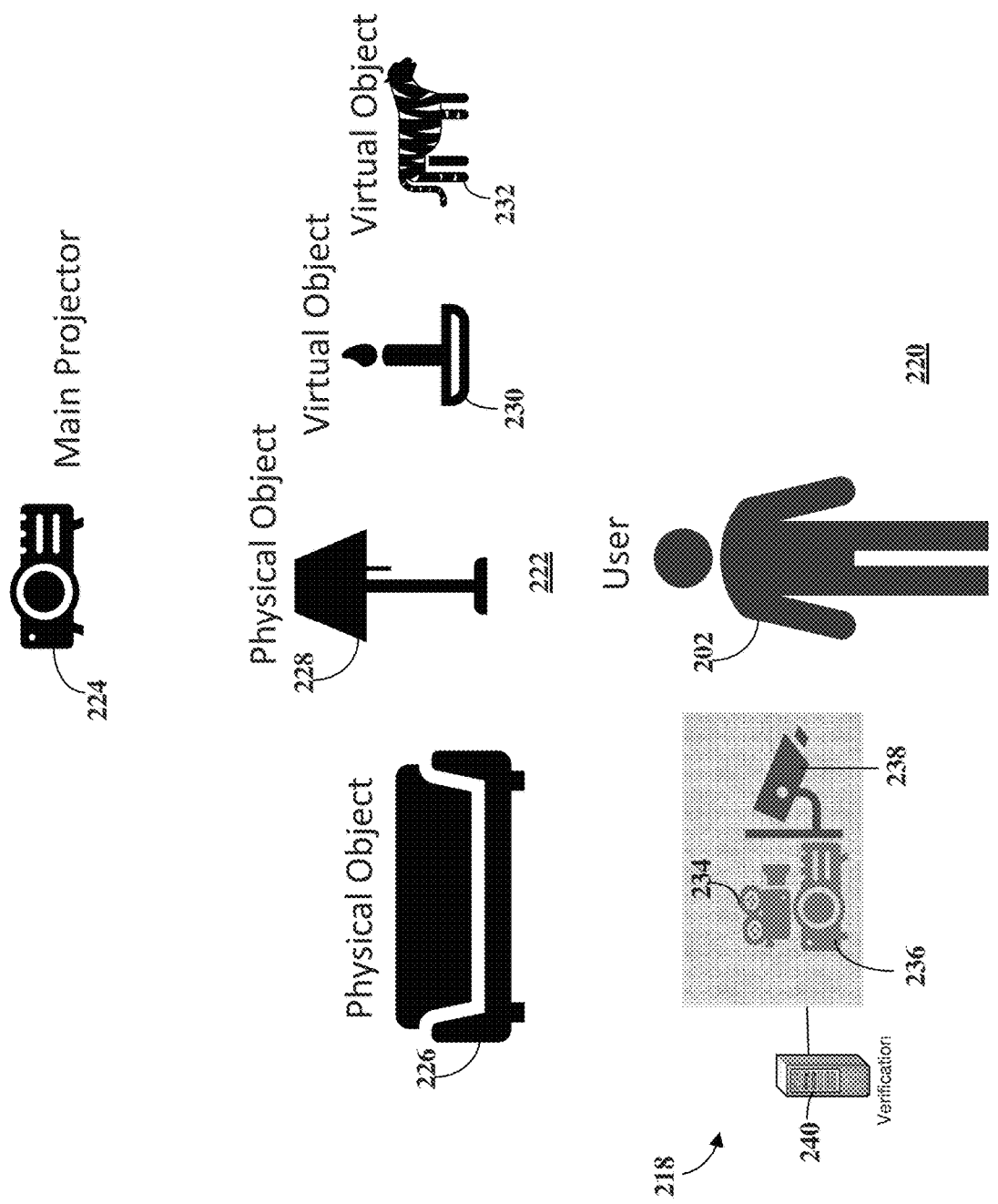
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 220 functioning within the communication network of FIG. 1 in accordance with various aspects described herein. The system 220 may include aspects and components of system 200 described in conjunction with FIG. 2A. System 220 illustrates a user 202 interacting with a virtual reality environment 222. System 220 includes verification module 218 for the virtual reality environment 222 and a main projector 224. The verification module 218 and the main projector 224 may be in data communication with other devices such as the user computer 206 and a remote processing device such as the AR server 210 of FIG. 2A. The other devices may be accessible over a communication network such as the communications network 212 of FIG. 2A. The virtual reality environment 222 may be created in an immersive experience space occupied by the user 202 and equipment including for example, the main projector 224 and the verification module 218 and other objects.

In an example operation, the main projector 224 projects an immersive experience for the user 202 in an immersive experience space. The immersive experience in the illustrated example includes a sofa 226, a lamp 228, a candle 230 and a tiger 232. In a fully immersive experience, the user 202 may not realize which objects are real and which are virtual. The verification module 218 detects, via a camera for example, that the tiger 232 is out of place in this environment with these other objects. One or more sensors, such as ultrasound sensor or an infrared sensor, is triggered to verify if the tiger 232 is real or is a projected image or hologram. After determining the tiger 232 is virtual and not a physical object, the verification module activates a projector or other signaling device to alert the user 202. In an example, the projector will overlay another project over the tiger 232 to make it clear to the user that the tiger 232, as well as the candle 230 and any other virtual objects in the space, are indeed virtual. In this way, the user 202 is informed what is real and what is virtual in the space in case there is a concern to the user. In a different example, the tiger 232 is a real object and could pose a danger to the user 202. The verification module 218 makes it clear to the user what is real and what is virtual and it is subsequently up to the user 202 to take action or continue the immersive experience.

The virtual reality environment 222 is created and maintained by equipment including the main projector 224. The main projector 224 may operate under control of another device such as the user computer 206 or AR server 210 (FIG. 2A) to generate the virtual reality environment 222. The virtual reality environment 222 may involve visual interaction among the user 202, other users, physical objects and virtual objects in the virtual reality environment. The user 202 may employ a wearable device such as VR headset 204 (FIG. 2A) to create an immersive experience for the user 202.

The virtual reality environment 222 includes the user 202 and a combination of physical objects and virtual objects. In the illustrated example, physical objects include the sofa 226 and the lamp 228. The physical objects are located in the space or environment with the user 202. The physical objects are tangible objects having mass and other physical properties. The physical objects may be static or dynamic. That is, the sofa 226 or the lamp 228, for example, may remain in place or may be moved by a user including the user 202 in the environment. When moving, the physical objects have dynamic physics, such as velocity and momentum. The physical objects may be altered as perceived by the senses of users such as the user 202 by the virtual reality environment 222. In an example, the physical objects may be made to have a different color or texture or may be hidden from view for a time by the virtual reality environment.

Virtual objects in the virtual reality environment 222 include the candle 230 and the tiger 232 in this example. The virtual objects are intangible and are created solely by the virtual reality environment 222. For example, images of the virtual objects may be created by an AR engine operating on, for example, a device such as the user computer 206 or AR server 210 (FIG. 2A). The created images are projected into the space with the user 202 by the main projector 224 to create the impression for users including the user 202 that the virtual objects are present in the space with the user 202. The virtual objects may appear to interact with other physical and virtual objects in the virtual reality environment 222. In an example, the tiger 232 may appear to attack the user 202, creating an apparent dangerous situation for the user 202 within the immersive experience.

The verification module 218 in some embodiments is part of a wearable device that may be worn by the user 202. The wearable device may be worn on the head or the arm of the user 202. In other embodiments, the verification module may positioned in a room or other environment, such as on a table, near the immersive experience space where an immersive experience is presented. In other embodiments, the verification module 218 and its constituent elements may be placed at permanent locations in a room such as a gaming room or a conference room. Any suitable arrangement of components to form the verification module may be used to provide a useful product for the user 202.

The verification module 218 in the embodiment includes a camera 234, a projector 236, one or more sensors 238 and a processing system 240. The camera 234 cooperates with the processing system 240 to view and analyze the virtual reality environment 222. The camera 234 may include any combination of sensing devices suitable to develop an understanding of the virtual reality environment 222 and activities in the virtual reality environment 222. Thus the camera 234 may include a conventional video camera generating image data for the virtual reality environment 222. The camera 234 may include an infrared camera for generating heat image data for the virtual reality environment 222. The camera 234 may include one or microphones to collect audio data for the virtual reality environment 222. The camera 234 may be supplemented with other devices as well.

The camera 234 provides visual data including images, audio data and other information to the data processing system 240 for analysis of the data gathered by the camera 234. The data processing system 240 may be physically associated with the camera 234 or may be part of another device, such as the user computer 206 or AR server 210 (FIG. 2A) and in data communication with the camera 234. The data processing system 240 may include an artificial intelligence module or a machine learning module to assist in analyzing the virtual reality environment 222.

The projector 236 may respond to control signals from the camera 234, the data processing system 240 or other device to modify the visual appearance of a virtual object in the virtual reality environment 222 and thereby identify the virtual object as virtual and not a physical object. The virtual object may be identified as a suspected object, for example in response to an inquiry from the user 202. In other embodiments, the verification module 218 may identify the suspected object based on current conditions or historical data. The projector 236 may cause the suspected object to have a different appearance to the user 202. For example, the projector 236 may cause the suspected object to appear out of focus or pixelated. In another example, the projector 236 may cause the suspected object to appear to have different colors or to have a particular visual affect, such as to appear to glow or to shimmer. In another example, the projector 236 may shine a particular light on the suspected object to alter the appearance of the suspected object. The projector 236 may respond to control signals from the processing system 240 to modify the appearance of the suspected object. In another example, the projector 236 may cooperate with the main projector 224 to severely reduce the resolution of the projection to make the projection of the suspected object very choppy or distorted. In some embodiments, the processing system 240 controls at least some aspects of the main projector 224. In some embodiments, if the processing system 240 concludes that the suspect object is a real object and not a hologram, the processing system may provide a signal to the user 202. The signal may be a sound or a spoken instruction over a speaker, a light condition or other stimulus to alert the user 202.

In some embodiments, the user 202 wears a wearable virtual reality device such as VR headset 204 (FIG. 2A) or VR goggles. In such embodiments, the camera 234 and the projector 236 may be integrated with the wearable virtual reality device to observe and affect the immersive experience seen by the user 202 wearing the wearable virtual reality device. For example, the camera 234 may be positioned inside the VR headset 204 to observe the immersive experience with the user 202. Similarly, the projector 236 may be positioned inside or on the VR headset so as to be able to illuminate or provide a visual modification to virtual objects or real objects, as appropriate, within the immersive experience for the user 202. In further embodiments, the user 202 wears a wearable virtual reality device while also being present in an immersive reality space with projected immersive reality features projected by the main projector 224. The camera 234 may include multiple cameras or lenses to observe both the immersive experience seen within the VR headset 204 and the projected immersive experience projected by the main projector 224. Similarly, the projector 236 may include multiple projectors to control or modify appearance of detected virtual objects or real objects in both the VR headset 204 or other virtual reality wearable or in an immersive experience in an immersive experience space.

Time duration of the alteration of the appearance of the suspected object may be controlled in any suitable manner. The projector 236 may alter the appearance of the suspected object for a predetermined time, such as for 5 seconds. In another example, the alteration of the appearance of the suspected object may continue by the projector 236 until a further input is received from the user. For example, the user 202 may provide an indication that the user 202 has successfully identified the suspected object and the alteration of the appearance by the projector 236 may stop. The user 202 may provide the indication in any suitable way, such as a predetermined hand gesture, a spoken word detected by a microphone of the verification module, or by activating an input device on a user interface such as the user interface of a wearable device worn by the user 202 and in data communication with the verification module 218.

The sensor 238 may include any suitable sensor to detect information about the area in which the user 202 is located. The sensor 238 may be an infrared sensor, an acoustic sensor, a radar system, a motion sensor system and others. A radar system and a motion sensor system may determine presence of a physical object in the immersive experience space occupied by the user 202 and another object. The sensor 238 may include environmental sensors that collect information such as temperature, wind speed, orientation or acceleration, or other physical factors of the environment where the user 202 is located. If the user 202 is operating a vehicle, the sensor 238 may detect vehicle speed and steering, acceleration and braking inputs by the user 202. If the vehicle is a driver assisted vehicle, the sensor 238 may collect all information available to the driver assistance system such as images from cameras, navigation and location data, data from Lidar sensors, and others.

In some embodiments, the sensor 238 may further gather information about the user 202. Such information may include biometric information, such as pulse rate or respiratory rate, skin conductivity, pupil dilation, haptic information about one or more touches of the user 202, and so forth. Thus, the sensors may include or be part of a wearable device such as a watch, belt or harness. Further, such user data may include information about the position, posture and movement of the user 202. Any sort of data that may be useful by the verification module 18 for monitoring the user 202 may be sensed by the sensor 238.

The sensor 238 may be in data communication with the processing system 240. In some embodiments, the sensor 238 merely senses a condition and report information to the processing system 240. In other embodiments, one or more of the sensors 208 may be controllable, such as by the processing system 240. The sensor 238, the processing system 240 as well as the camera 234 and the projector 236 may be in data communication with other devices over any suitable communication networks.

In an example of operation, the camera 234 operates in conjunction with the processing system 240 and the sensor 238 to try to understand the virtual reality environment 222. The camera 234 and the processing system 240 cooperate to identify an unrecognized situation that requires further evaluation. In a first embodiment, the camera 234 and the processing system 240 operate to identify an unrecognized situation and, in response, activate the sensor 238 to collect additional information. In a second embodiment, the user 202 takes an action that serves as an input to the sensor to cause the sensor to collect additional information.

The camera 234 provides data and information to the processing system 240. The camera 234 provides image data, for example, that may be used by the processing system 240 to determine objects in the virtual reality environment 222 and to understand whether the objects are virtual or real objects. For example, if the virtual reality environment 222 is a classroom full of children and a dog, the processing system 240 operates to determine if the dog is a virtual dog or a real dog. The processing system 240 may receive information from the sensor 238 to use to understand the environment. For example, the sensor 238 may provide information that the user 202 or others present in the virtual reality environment 222 are panicking. In another example, the camera 234 may provide an image of a fierce animal such as tiger 232. The sensor 238 may include an infrared sensor that responds to heat information to confirm the presence of a live tiger or, if no significant heat signal is present, to clarify that the tiger 232 is a virtual tiger. Based on received inputs, the processing system 240 determines a reason for the panic, such as the presence in the virtual reality environment 222 of a virtual tiger.

In embodiments, the processing system 240 includes an artificial intelligence or machine learning module. The processing system 240, in conjunction with the artificial intelligence or machine learning module, operates to identify an unrecognized situation for the user 202. An unrecognized situation is one in which the user 202 may be immersed in an experience and unable to discern real objects, characters and events from virtual objects, characters and events. In extreme cases, the unrecognized situation may cause the user 202 to feel endangered because of the presence of a dangerous object or situation, such as the tiger 232. In other cases, the user 202 may feel disorientated about the boundaries of reality and virtuality. The processing system 240, in conjunction with the artificial intelligence or machine learning module, operates to ensure an enjoyable user experience for the user 202. An enjoyable user experience generally excludes anxiety, fear, panic, disorientation and confusion. In some embodiments, the artificial intelligence or machine learning module may receive inputs from the user to control the extent to which the user wishes to have an unrecognized situation identified and managed for the user by the verification module 218.

The artificial intelligence or machine learning module is able to learn from past experience to develop an understanding of current situations in the virtual reality environment 222. The artificial intelligence or machine learning module may communicate with a remote source of information to receive training information and other data sets. The artificial intelligence or machine learning module may be provided with an initial model defining objects or situations that are associated with an unrecognized situation. For example, presence of a weapon or a tiger 232 in the virtual reality environment 222 represents an unrecognized situation. The virtual reality environment 222 may receive update model information over time to assist in identifying and evaluating unrecognized situations.

In one example, the verification module 218 is part of a service provided by a service provider. In an embodiment, the verification module 218 operates as an app on the mobile phone or other device of the user 202. A service provider may be the operator of a mobile network accessible by the mobile device or a broadband network providing content items such as video, gaming and immersive experiences to users such as user 202. In such an example, the service provider may collect at a remote site information received from multiple verification modules of multiple users. The information may be used to develop training data and other information which may be communicated over a network of the service provider to the verification module 218.

In this embodiment, the processing system 240 has access to up-to-date information about immersive experiences in a virtual reality environment 222 that may present an unrecognized situation for the user 202. The processing system 240 may use the up-to-date information to automatically identify the unrecognized situation and provide reassurance to the user 202.

In an example, the virtual reality environment 222 is a classroom full of students including the user 202. The camera 234 provides an image of a dog in the classroom to the processing system 240. In one embodiment, the processing system 240 refers to an initial rule set and concludes that a dog should not be in a classroom and therefore automatically alerts the user 202 to the unrecognized situation. In a second embodiment, the processing system 240 has access to an updated rule set with information that sometimes, service dogs are present in classrooms. The updated rule set is based on information collected from other users in other immersive experiences. Based on this information and the updated rule set, the processing system 240 does not alert the user 202 to an unrecognized situation.

In another examples, the verification module 218 may be used to resolve possible confusion among real objects or people and virtual objects or people or holograms. In a first example, an immersive reality game is being played among a group including the user. At some point, a player introduces a second ball to the game. This may create some confusion about whether second ball is a real ball or a virtual ball. The user 202 can signal verification module 218 to identify the second ball. If the second ball is real, the verification module 218 provides a suitable indication to the user 202. If the second ball is a virtual ball, the validation module illuminates the second ball to provide a clear visual indication that the second ball is a hologram or a virtual ball. In a first embodiment the visual indication is visible only to the user 202 associated with the verification module 218. In a second embodiment, the visual indication is visible to all participants in the immersive reality game.

In a second example, at a party, a person attending the party may be a real person or may be a hologram of an individual who is actually located remotely. In case of a question, the user 202 can activate the verification module 218 to provide an indication of that the person is a real person or a hologram.

In an embodiment, multiple users have devices including respective verification modules 218. The multiple users, or their validation modules, may collaborate. This may be done on an opt-in process in which the user 202 agrees to share data with other systems including other validation modules. For example, at a party where guests are enjoying an immersive experience together, a first verification module 218 may initiate a collaboration. The validation modules share information, including camera data from the camera 234 of each validation module and sensor data from the sensor 238. Sharing may be in any suitable fashion, such as by wireless communication over a Bluetooth connection, Wi-Fi or other network connection. The respective processing systems may share conclusions about a suspect object or unrecognized situation. The respective processing systems may collaborate to alter the hologram of a virtual object which is threatening or otherwise represents a suspect object or an unrecognized situation.

Figure 2C:
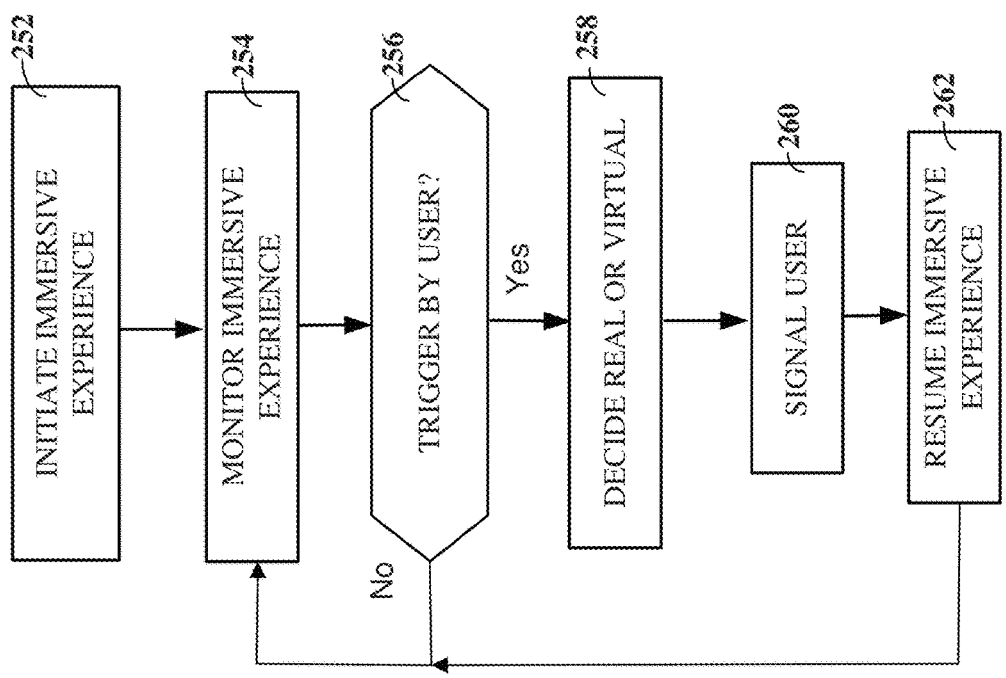
FIG. 2C depicts an illustrative embodiment of a method in accordance with various aspects described herein.

FIG. 2C depicts an illustrative embodiment of a method 250 in accordance with various aspects described herein. In embodiments, the verification module can be triggered by a user such as user 202 or by occurrences in the virtual reality environment 222. FIG. 2C shows one embodiment of a method 250 in which the user triggers the verification module 218. Both methods may operate independently and simultaneously in embodiments to assist users in identifying what it real in a virtual environment and what is virtual in the virtual environment.

At block 252, an immersive experience is initiated. The immersive experience may be implemented for one or more users in a particular space or environment which may be termed an immersive experience space. The users may use wearable equipment, such as a virtual reality headset or goggles to enable them to visually engage with the immersive experience. In some examples, the users may use plain, unassisted sight to participate in the immersive experience in which, for example, visual aspects of the immersive experience are provided by a main projector or on a display device such as a computer monitor, or a combination of these. The immersive experience may include audio aspects as well, and the equipment may include one or more speakers for providing audio components to the users and one or more microphones for collecting audio information in the space or environment. The immersive experience may be provided in any suitable manner by any suitable equipment, such as a user computer located in or near the space or an augmented reality server accessible over a communications network.

At block 254, the immersive experience is monitored by, for example, a verification module. In the method 250, the verification module monitors user reaction to detect a request to intervene in the immersive experience and identify virtual or real features. For example, users using goggles or with plain sight become immersed in the experience and may lose their bearings or orientation or the ability to readily discern what aspects of the immersive experience are real and what are virtual. The better and more immersive the experience, the more likely this may happen to a user. A more immersive experience may rely on improved data communication technology and virtual reality or augmented reality technology to blur or obscure boundaries between real, physical aspects of the experience and virtual aspects of the experience. Such aspects may include objects, individuals and situations, such as weapons, threatening people, and a dangerous location or situation where the user may be situated. The user may be confronting a suspect object that seems out of place or unexplained or risky in some way. The user may be confronting an unexpected situation that leaves the user unsettled or alarmed or concerned, particularly if the user is fully immersed in the experience. The unexpected situation may involve a suspected object that might pose a risk to the user and the nature of which as a real or virtual object is unclear. The unexpected situation may involve a suspected action, such as real or virtual user performing an unexpected act that may threaten the user. The user may feel that something is off, such as a person in the immersive experience charging at the user, and wonder whether the person is a real person or just a virtual reality projection. In such a case, the user needs clarification and to snap out of the immersive experience for a moment. If everything is as expected, then the user can resume the experience. If a genuinely dangerous or concerning situation is present, the user can take other actions to alter or terminate the experience.

At block 256, the method 250 includes detecting a trigger initiated by one or more users. The trigger operates as an indication from the user multiple users requesting identification or verification of a suspected object for the user. The indication may be a predefined hand gesture or a spoken word by the user 202. In embodiments, the method 250 views the particular space where the user is located during the immersive experience, such as with a camera. The camera may be sensitive to visual light, infrared energy or any other suitable technology to monitor the activities of the user. In other embodiments, a motion detector may be sensitive to user motions, such as through radar or lidar to detect a hand gesture, head motion, body motion or other trigger of the user. In still other embodiments, the method may employ a microphone or other audio-sensing technology to detect an audible trigger from the user. For example, the user may have specified a trigger word which, when uttered, serves as a trigger at block 256. In yet other examples, the method may rely on information from other sensors to detect biometric information of the user, such as pulse rate or respiratory rate, skin conductivity, pupil dilation, haptic information about one or more touches of the user, for example. Based on an elevated respiratory rate, for example, the method 250 may conclude the user is anxious and identify the respiratory rate or anxiety as a trigger at block 256. In other embodiments, any other identification of a questioned object may serve as a trigger and as a request for clarification.

At block 258, the method 250 identifies real or virtual objects in the immersive experience. In an embodiment, the method receives input from a camera, sensors, or both that are viewing the particular space where the user is located during the immersive experience. A processing system may receive image data and other sensory data and run analytics on the received image data and sensory data. In some embodiments, the analytics may use artificial intelligence or machine learning (collectively referred to as AI/ML) to identify virtual or real objects or persons in the immersive experience. The AI/ML understands, from past experience and learning from this system and other cooperating systems, what is an acceptable situation and what is not depending on the situation, the location, other users, and other factors. For example, a paralyzed man in a wheelchair jumps suddenly to attack others may trigger the system to perform detection via analytics and to conclude that, based on experience, such a person is most likely a virtual object.

Thus, in some embodiments, the AI/ML system retrieves from storage information about known immersive experience situations. The AI/ML system compares any information about the current immersive experience such as image information from the camera and sensor data from sensors, with the retrieved information about known immersive experience situations. Based on the comparison, the AI/ML system may conclude that an object is more likely a virtual object or more likely a real object and alert the user accordingly. As the AI/ML system processes more immersive experiences, the AI/ML system becomes trained on the immersive experiences and develops a knowledge base for comparison with image and other data for current immersive experiences.

In some embodiments, the method 250 may rely on inputs from a sensor system, such as a system using microwave sensors, ultrasound sensors, infrared sensors and others, to verify objects appearing in the immersive experience. This includes those objects that prompted the user to trigger the detection process at block 256. In this manner, the user understands quickly what is going on in the immersive experience when the method exposes the objects.

At block 260, the method 250 provides an indication to the user about virtual or real objects in the immersive experience. In an embodiment, the method 250 uses a projector to modify the visual appearance of a suspected object to show that the suspected object is a virtual object. For example, the projector may cause the suspected object to appear to the user to be out of focus or pixelated. In another example, the projector 236 may cause the suspected object to appear to have different colors or to have a particular visual affect, such as to appear to glow or to shimmer. In another example, the projector may illuminate the suspected object with a particular light to alter the appearance of the suspected object for the user. In another example, the method 250 may overlay another projection over the suspected object to make it appear as a virtual object along with the other virtual objects in the immersive experience, so the user knows what is virtual and what is real and if there is a concern to the user. In other embodiments, the method 250 makes it clear to the user what is real and what is virtual, and it is up to the user to take action or continue the immersive experience.

At block 262, the method resumes the immersive experience. Control returns to block 254 where the method 250 continues monitoring the immersive experience. In some examples, the user may decide to modify or terminate the immersive experience based on the identification of the suspected object or an unexpected situation.

Figure 2D:
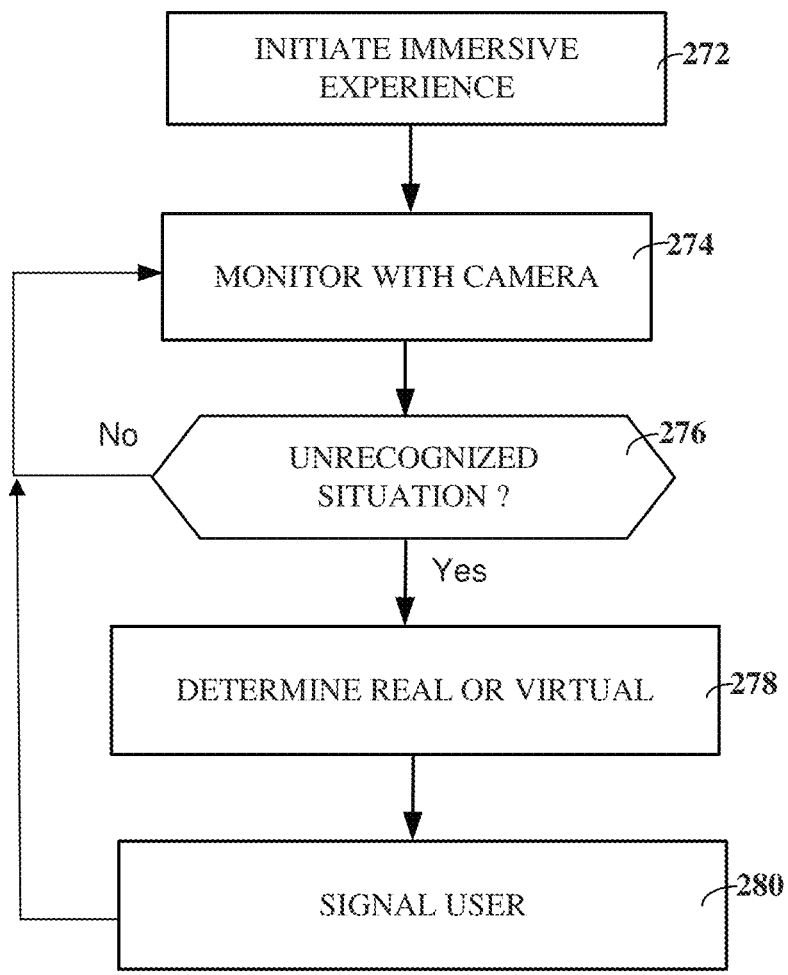
FIG. 2D depicts an illustrative embodiment of a method in accordance with various aspects described herein.

FIG. 2D depicts an illustrative embodiment of a method 270 in accordance with various aspects described herein. In FIG. 2D, the method 270 illustrates an embodiment in which the verification module can be triggered by occurrences in an immersive experience created in an immersive experience space as illustrated in FIG. 2B.

At block 272, similar to block 252 (FIG. 2C), immersive experience is initiated. The immersive experience may be implemented for one or more users in a particular space or environment. In the immersive experience, visual aspects are provided by a main projector or on a display device such as a computer monitor, or a combination of these. The users may use equipment such as a virtual reality headset or goggles to visually engage with the immersive experience. In other examples, users may use unassisted eyesight for the immersive experience. The immersive experience may include audio aspects as well, and the equipment may include one or more speakers for providing audio components to the users and one or more microphones for collecting audio information in the space or environment. The immersive experience may be provided in any suitable manner by any suitable equipment.

At block 274, the immersive experience is monitored by, for example, a verification module. For example, the verification module monitors the scene of the immersive experience to identify an unexpected situation that may affect the user, such as leaving the user unsettled or alarmed or concerned. Further, the verification module monitors the scene to identify an unexpected situation that may be out of the ordinary. Still further, the verification module monitors the scene to identify a suspected object or a suspected action that may cause concern or suspicion by a user involved in the immersive experience. The method 270 may receive information such as image data and sensor data from one or more cameras and sensors. The method 270 reviews the received data to identify an unexpected situation or unrecognized situation, an out of the ordinary situation, or a suspected object.

At block 276, the method 270 determines if the immersive experience involves an unexpected or unrecognized situation, an out of the ordinary situation, or a suspected object, or some other situation that should be called to the attention of the user. The unexpected action may be based on a suspected object or a suspected action occurring in the immersive experience. In some embodiments, the method 270 relies on artificial intelligence or machine learning (collectively, AI/ML) to analyze the scene. For example, the method 270 receives data about the immersive experience. The method 270 further receives information about other immersive experiences and compares features of the current immersive experience with the retrieved information about similar immersive experiences. The method 270 may store and retrieve information about acceptable and unacceptable immersive experiences, including as part of an AI/ML process.

In another embodiment, the method 270 may receive information from a remote source about analysis of other immersive experiences. For example, the method 270 may be implemented as part of a service which monitors immersive experience for user, such as on a subscription basis. Other devices monitor other users and the immersive experiences of the other users. Information about such immersive experiences and user interaction therewith may be shared as part of the service. As part of the service, the shared information is provided to the method 270 for monitoring and analyzing immersive experiences including the current immersive experience. In an example, the immersive experience being monitored at block 274 and analyzed at block 276 may involve a sporting event in which the user participates with others. The method 270 may determine that a dog is present in the immersive experience and that the presence of a dog in such an experience is not normal and should be signaled to the user. However, based on additional information received from a remote source, the AI/ML process may determine that sometimes service dogs or companion animals are present at such a sporting event or immersive experience. Based on that determination, the method 270 may decide not to alert the user. In some embodiments, the method 270 may choose an alert from several possible alerts. In this example, the chosen alert may be a low-level alert that merely calls the presence of the dog to the attention of the user, rather than a higher-level alert that sounds an emergency and signals danger.

At block 276, if no unrecognized situation or other occurrence is determined by the method 270 which requires alerting the user, control returns to block 274 to continue monitoring the immersive experience. The method 270 may remain in a loop including block 274 and block 276 during the progress of the immersive experience until the immersive experience ends or is terminated or interrupted by the user.

If, at block 276, an unrecognized situation or suspected object is determined, at block 278, the method 270 determines if the suspected object is a real object in the space with the user or a virtual object or hologram that is not a physical object and exists only as part of the immersive experience. In the example where a dog is present at a sporting event in an immersive experience, the AI/ML process understands that a dog is not normally present in such a situation. The method 270 in some embodiments collects information from one or more sensors. The sensors may include, for example, microwave sensors, ultrasound sensors, infrared sensors, audio sensors, and others. The sensor information may be used by the method 270 to determine if the objects appearing in the immersive experience, including those which triggered the detection process, are real or not. Position information from the sensors may be compared with position information from, for example, a camera. In the example, the method 270 receives information from an infrared sensor that detects the heat signature associated with a live dog in the same position as was determined by image information from a camera. The method 270 then concludes that the dog is real. On the other hand, if the infrared sensor indicates no heat signature, and other sensors such as radar or lidar indicate no physical body present in the location where the camera identified the dog, the method 270 concludes the dog is virtual.

At block 280, the method 270 signals the user about the unrecognized situation or suspected object. This may be done in any suitable way in the immersive experience. For example, the method 270 may include severely reducing the resolution of the projection of the immersive experience to make the projection appear very choppy, if the method is connected to and in control of the projection system. In another example, the method 270 may include projecting different color light onto the virtual objects in the immersive experience space from a separate projector. The separate projector may be wearable by the user such as mounted on the head on the user or affixed in the place as a separate system under control of the method 270.

In other embodiments, any suitable or appropriate signal may be provided to the user at block 280. For example an audio tone may be sounded for the user to hear, or a first distinct audio tone may be sounded to indicate a suspected object is real and a second audio tone may be sounded to indicate the suspected object is virtual or a hologram. If the user is wearing a headset or goggles or other wearable device that permits haptic response, the block 280 may include generating a haptic signal to the user such as a vibration or tapping on the skin of the user.

After signaling the user at block 280, control may return to block 274 to continue monitoring the immersive experience. In other embodiments, the method may end, the immersive experience may end or the user may terminate the immersive experience.

While for purposes of simplicity of explanation, the respective processes are shown and described as a series of blocks in FIG. 2C and FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, method 250 and method 270 presented in FIGS. 1, 2A, 2B, 2C, 2D, and 3. For example, virtualized communication network 300 can facilitate in whole or in part presenting an immersive experience to a user, determining if an object or a situation in the immersive experience is likely to make the user feel apprehension or concern, identifying the situation or identifying the object as a virtual object, and changing the visual appearance of the object or the situation to verify real and virtual objects in the immersive experience to reassure the user.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
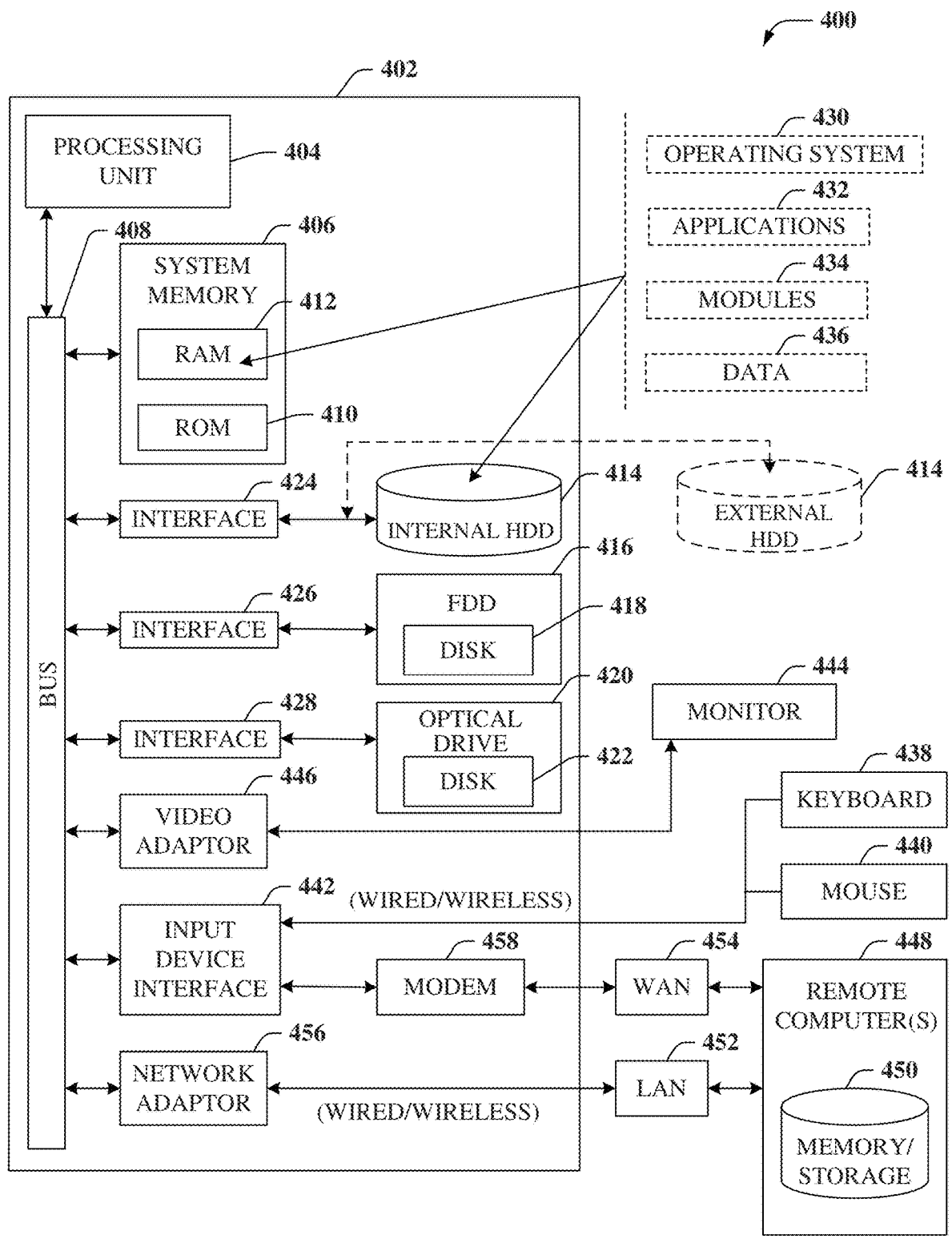
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part presenting an immersive experience to a user, determining if an object or a situation in the immersive experience is likely to make the user feel apprehension or concern, identifying the situation or identifying the object as a virtual object, and changing the visual appearance of the object or the situation to verify real and virtual objects in the immersive experience to reassure the user.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
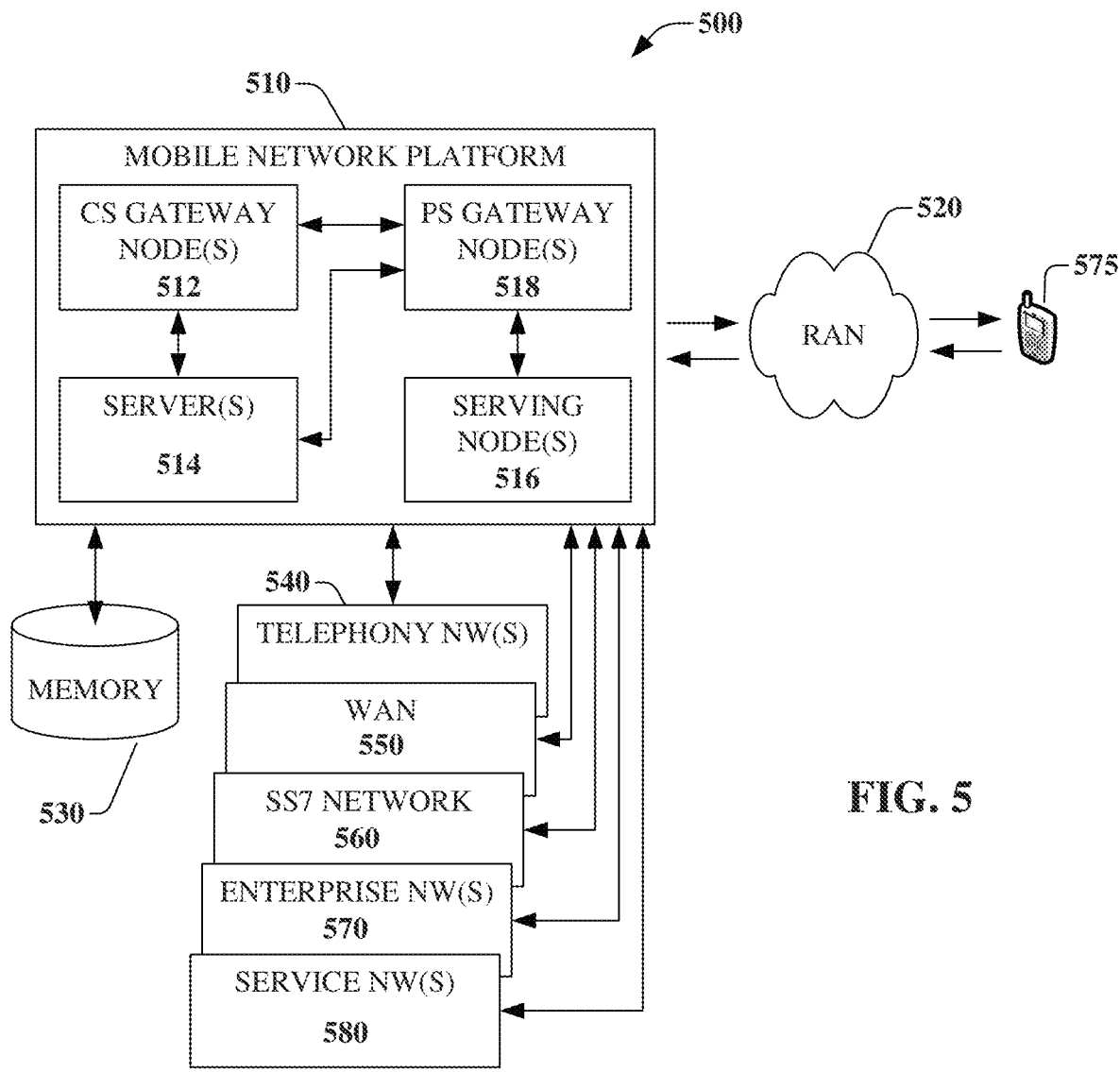
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part presenting an immersive experience to a user, determining if an object or a situation in the immersive experience is likely to make the user feel apprehension or concern, identifying the situation or identifying the object as a virtual object, and changing the visual appearance of the object or the situation to verify real and virtual objects in the immersive experience. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
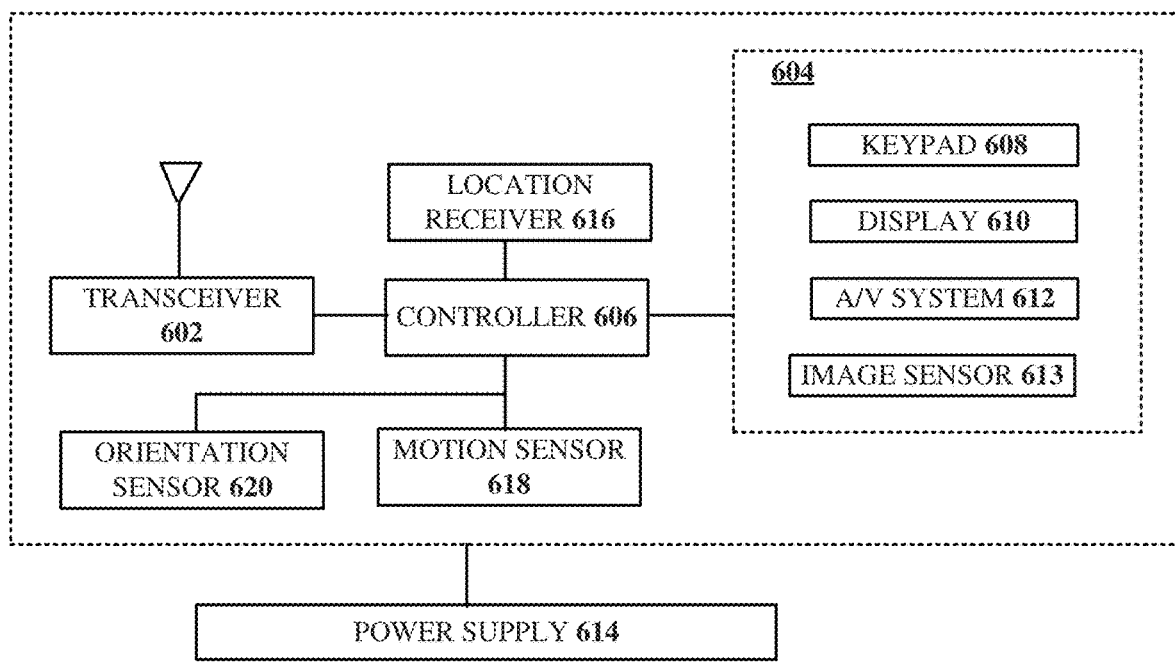
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part presenting an immersive experience to a user, determining if an object or a situation in the immersive experience is likely to make the user feel apprehension or concern, identifying the situation or identifying the object as a virtual object, and changing the visual appearance of the object or the situation to verify real and virtual objects in the immersive experience.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantumdot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
   a camera positioned to capture image information of an immersive experience presented to one or more users, the one or more users engaged in the immersive experience, the one or more users located in an immersive experience space;
   a processing system including a processor and a memory that stores executable instructions that, when executed by the processing system, facilitate performance of operations, the operations comprising:
      receiving the image information from the camera;
      detecting objects in the image information, wherein the objects are located in the immersive experience space with the one or more users, the objects including at least one virtual object created by the immersive experience;
      identifying, in the immersive experience, an unexpected situation that may affect a user of the one or more users, wherein the identifying an unexpected situation is responsive to the image information;
      comparing, by a machine learning system, the image information with information about known immersive experience situations; and alerting a user of the one or more users about the unexpected situation, wherein the alerting is based on the comparing the image information with the information about known immersive experience situations;
      determining the at least one virtual object is a projected virtual object of the immersive experience;
      generating a signal indicating the at least one virtual object is a projected virtual object; and
   a projector, responsive to the signal, to provide a visual indication in the immersive experience space to identify the projected virtual object as a virtual object to the one or more users engaged in the immersive experience.

2. The system of claim 1, wherein the projector is responsive to the signal to overlay a projected image on the projected virtual object in the immersive experience space to clearly designate the projected virtual object as a virtual object.

3. The system of claim 1, wherein the projector is responsive to the signal to reduce a projection resolution the projected virtual object in the immersive experience space to clearly designate the projected virtual object as a virtual object.

4. The system of claim 1, further comprising:
   sensors configured to collect environmental information of the immersive experience space.

5. The system of claim 4, wherein the camera, the projector and the sensors are integrated as a wearable device wearable by a user of the one or more users.

6. The system of claim 4, wherein the operations further comprise:
    detecting a suspected object in the immersive experience space;
    receiving at the processing system the environmental information from the sensors;
    comparing the environmental information with the image information from the camera; and
    determining, based on the comparing, the suspected object is a virtual object or a real object.

7. The system of claim 4, wherein the sensors comprise:
    an infrared sensor to detect infrared energy in the immersive experience space; and
    a radar system to detect physical objects in the immersive experience space.

8. The system of claim 1, wherein the operations further comprise: retrieving, from a knowledge base, the information about known immersive experience situations.

9. The system of claim 8, wherein the operations further comprise:
    updating the knowledge base with information about the immersive experience and the image information.

10. The system of claim 9, wherein the operations further comprise:
    receiving, at the processing system, environmental information about the immersive experience space from one or more sensors;
    comparing the environmental information with the image information from the camera; and
    alerting, based on the comparing of the environmental information with the image information, the user of the one or more users about the unexpected situation.

11. The system of claim 1, wherein the operations further comprise:
    receiving, by the processing system, an indication from a user of the one or more users, the indication requesting a verification from the processing system of a suspected object in the immersive experience space;
    determining, based at least on the image information, that the suspected object is a projected virtual object of the immersive experience; and
    generating an identification signal to identify the suspected object as a projected virtual object, wherein the projector is responsive to the identification signal to modify appearance of the suspected object in the immersive experience to indicate to the user that the suspected object is a projected virtual object of the immersive experience.

12. The system of claim 11, wherein the receiving an indication from the user comprises:
    detecting a hand gesture or a spoken word of the user as the indication.

13. A non-transitory machine-readable medium, comprising executable instructions that, when executed by a processing system including a processor, facilitate performance of operations, the operations comprising:
    receiving image data from a camera, the camera positioned to collect images of an immersive experience occurring in an immersive experience space including one or more objects and one or more users engaged in the immersive experience;
    detecting, based on the image data, an unexpected situation of the immersive experience, the unexpected situation including a suspected object or a suspected action, wherein the unexpected situation the suspected object or suspected action in the immersive experience could alarm a user of the one or more users;
    comparing, by a machine learning system, the image data with information about known immersive experience situations; and alerting the user about the unexpected situation, wherein the alerting is based on the comparing the image data with the information about known immersive experience situations, and wherein the alerting comprises modifying visual appearance of the object or the action in the immersive experience that could alarm the user,
    identifying virtual objects and real objects among the one or more objects responsive to the detecting; and
    modifying a visual aspect of at least one virtual object of the one or more objects in the immersive experience to identify to the one or more users the at least one virtual object as a virtual object for reassuring the one or more users engaged in the immersive experience.

14. The non-transitory machine-readable medium of claim 13, wherein the modifying a visual aspect of at least one virtual object comprises:
    reducing a projection resolution the virtual object in the immersive experience space to clearly designate the virtual object as a virtual object for a predetermined time period for reassuring the one or more users engaged in the immersive experience.

15. The non-transitory machine-readable medium of claim 13, wherein the identifying virtual objects and real objects comprises:
    collecting sensor data from one or more sensors positioned in the immersive experience space with the one or more objects and the one or more users.

16. The non-transitory machine-readable medium of claim 15, wherein the identifying virtual objects and real objects comprises:
    identifying real objects of the one or more objects based on the sensor data.

17. A method, comprising:
    projecting, by a processing system including a processor, an immersive experience in an immersive experience space occupied by one or more real objects and one or more users, the projecting the immersive experience including projecting one or more holograms in the immersive experience space;
    receiving, by the processing system, image information from a camera viewing the immersive experience space during the projecting of the immersive experience;
    receiving, by the processing system, sensor information from one or more sensors located in the immersive experience space;
    receiving, by the processing system, an indication from a user of the one or more users, the indication requesting a verification from the processing system of a suspected object in the immersive experience space;
    determining, by the processing system, whether the suspected object is a real object or a hologram of the one or more holograms projected in the immersive experience space, wherein the determining is responsive to the image information and the sensor information; and
    modifying, by the processing system, a visual aspect of the suspected object in the immersive experience space, wherein the modifying is responsive to a determination that the suspected object comprises a hologram, and wherein the modifying the visual aspect forms a clear verification to the user that the suspected object is a hologram.

18. The method of claim 17, wherein the modifying a visual aspect of at least one virtual object comprises:

changing, by the processing system, a projection resolution of the suspected object to indicate the suspected object is a virtual object and not a real object in the immersive experience space.

19. The method of claim 17, wherein the receiving an indication from the user comprises:
identifying, by the processing system, in the image information from the camera viewing the immersive experience space, a predetermined gesture of the user.

20. The method of claim 17, wherein the determining whether the suspected object is a real object or a hologram comprises:
receiving, by the processing system, physical sensor data including one or radar data or motion sensing data; and
determining, by the processing system, that the suspected object comprises a real object.

* * * * *